United States Patent [19]

Gioiosa

[11] Patent Number: 5,521,468
[45] Date of Patent: May 28, 1996

[54] SYNCHRONIZATION PULSE SEPARATION CIRCUIT FOR CRT DEVICE

[75] Inventor: Anthony V. Gioiosa, Justice, Ill.

[73] Assignee: Display Technologies Inc., Carthage, Mo.

[21] Appl. No.: 148,698

[22] Filed: Nov. 5, 1993

[51] Int. Cl.$^6$ .................................................. H01J 29/56
[52] U.S. Cl. ........................ 315/370; 348/513; 348/533
[58] Field of Search .......................... 315/370; 348/513, 348/514, 516, 517, 533

[56] References Cited

U.S. PATENT DOCUMENTS 5,043,813  8/1991  Christopher .
5,189,515  2/1993  Chen .

Primary Examiner—Theodore M. Blum
Attorney, Agent, or Firm—Margaret Marsh Parker

[57] ABSTRACT

In monitor circuitry, a simple circuit separates out the horizontal synchronization pulses from the composite synchronization signal and removes undesired horizontal synchronization pulses during the vertical blanking period. By using a pulse-width modulated signal having the same frequency as the horizontal rate but not necessarily with the same phase, and having at least a 50% duty cycle, the undesired pulses are gated out before being coupled to the horizontal synchronization circuit of the monitor, thus, the monitor system will not attempt to lock at a double frequency, nor cause visible distortion of the raster. The effect of the pulse width modulated signal is inhibited when a user changes the horizontal synchronization frequency and until the monitor achieves lock on the new frequency.

16 Claims, 1 Drawing Sheet

SYNCHRONIZATION PULSE SEPARATION CIRCUIT FOR CRT DEVICE

BACKGROUND OF THE INVENTION

This invention relates to the field of cathode ray tube device control circuits and, more particularly, to the elimination of unwanted sync pulses in the circuitry of such devices.

In television and display monitor devices, many methods have been devised for the separation of composite horizontal and vertical sync pulses. In the particular monitor for which the present invention was devised, a computer provides a composite signal containing video and synchronization pulses, very similar to those common to television systems. The video signal provides information which determines the instantaneous brightness of the phosphors on a cathode ray tube as a function of the level of the signal above a given "black" level, while horizontal and vertical synchronization signals are below the black level and appear as positive or negative pulses. The horizontal and vertical pulses are utilized in forming the raster or framework of the video display, and thus must be separated from the composite signal and from each other in order to be utilized in the raster circuitry. A problem arises in separating out the horizontal synchronization signal since the composite signal contains unneeded pulses for this application, and if such pulses are gated through, the raster will not be properly formed. In some composite signals used, the video display is interlaced; i.e., one frame is formed of two fields. The first field is displayed by "painting" one horizontal line on the phosphor face of the CRT by means of an electron beam. The beam is then "darkened" and pulled back to the first edge of the display to be brightened again and create the second horizontal line of the display. This process will be repeated until the field is complete. In the middle of the bottom line of the first field, the beam is again darkened and brought up to the middle of the top line to begin the second field. The horizontal lines of the second field will therefore be displaced from those of the first field by one-half line space, giving greater definition to the visual display. The composite synchronization signal consists of a series of horizontal sync pulses, followed by a vertical sync pulse. Since the horizontal pulse rate must be maintained during the vertical pulse, the horizontal pulses are inverted during that period, foiling serrations in the vertical pulse which allow the horizontal sync rate to remain locked. Extra horizontal synchronization pulses are required which would not be needed if the display fields were not to be interlaced. In this application, the raster is not to be formed of interlaced lines, thus, the unneeded horizontal pulses during the vertical pulse must be gated out while allowing all desired pulses to pass through.

An additional problem arises in that removal of the undesired pulses must be accomplished in such a way that the horizontal phase/frequency can be adjusted, as by the device user, without affecting the process of eliminating the unwanted horizontal sync pulses.

SUMMARY OF THE INVENTION

One object of the present invention is to allow all desired pulses of a composite synchronization signal to be usable while deleting or gating out all undesired pulses.

An additional object is to provide for adjustment of the phase of the horizontal synchronization signals without losing the capability of gating out all unwanted pulses.

The circuit of the invention is designed to operate within a given monitor which provides a synchronization signal containing both horizontal and vertical synchronization signals and may also include additional and undesired horizontal synchronization pulses during the vertical synchronization interval. The undesired pulses are therefore prevented from causing hooking of the top of the raster.

The given monitor also allows for user control of the horizontal synchronization signal frequency/phase and the circuit of the invention prevents a change in frequency/phase from causing a disruption in the basic circuit function.

DETAILED DESCRIPTION OF THE PREFERRED EMBODIMENT

Figure 1:
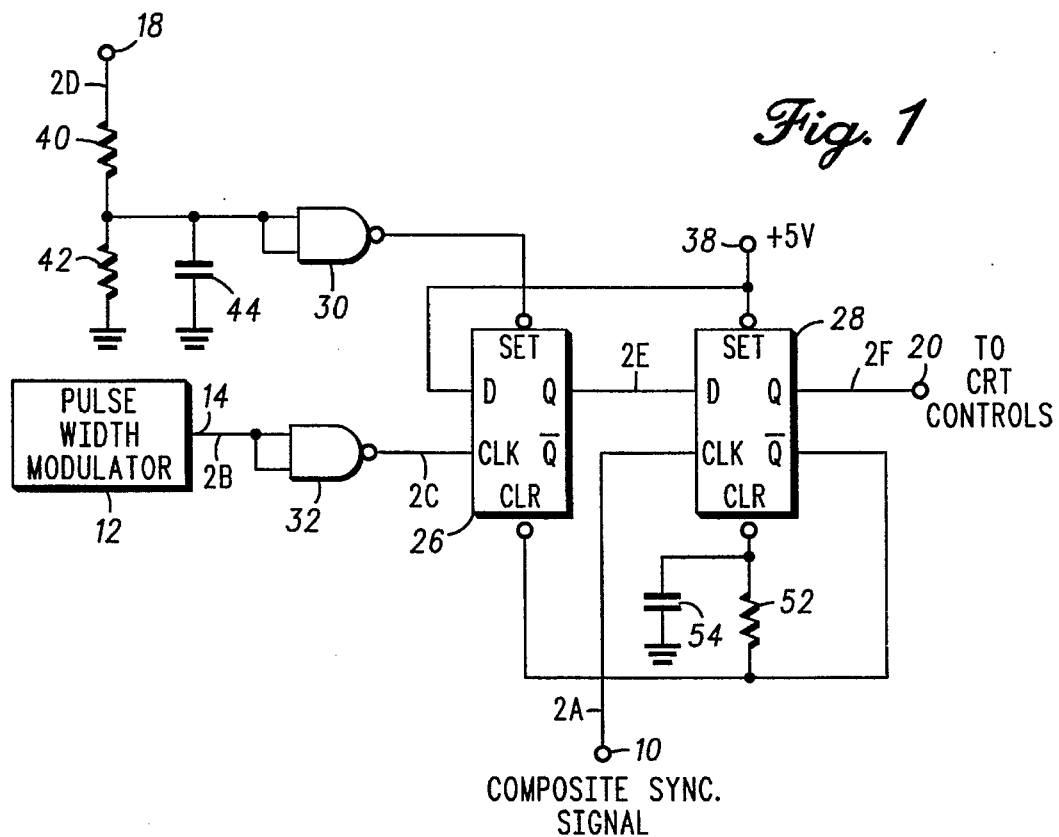
FIG. 1 is a circuit diagram showing the preferred embodiment of a circuit in accordance with the present invention.
Figure 2:
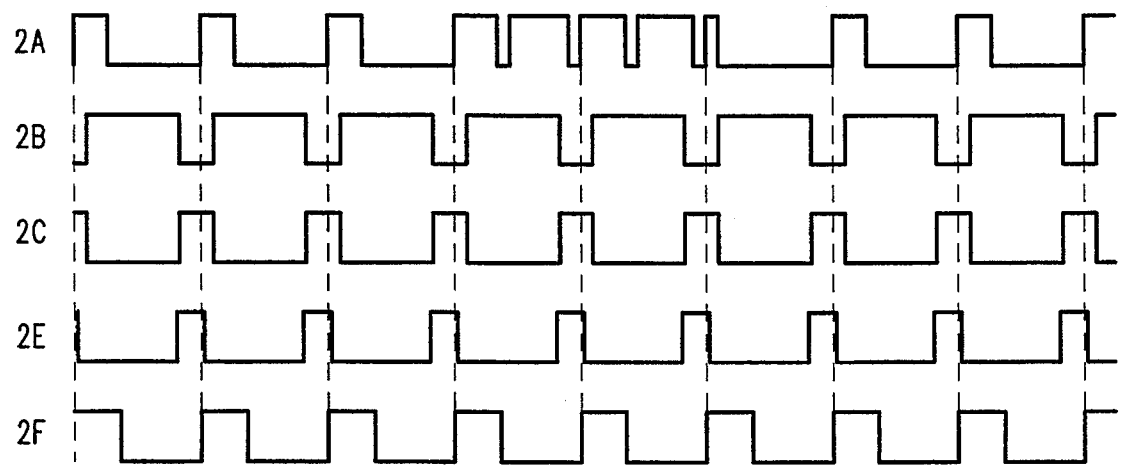
FIG. 2 is a chart of waveforms relating to FIG. 1.

Since the waveforms of FIG. 2 are integral to the circuitry of FIG. 1, the two figures will be described together. The waveforms are not drawn to scale.

FIG. 1 shows a circuit diagram of a preferred embodiment of the present invention as utilized in a display monitor. There are three input signals. As shown in FIG. 2, waveform 2A is the composite synchronization signal;, i.e., a combination of the horizontal sync and the vertical sync which is coupled from an external computer via a terminal 10. The video portion of the signal has already been removed. Waveform 2B comes from a pulse-width modulator circuit 12 via a terminal 14, and is inverted-internally to form waveform 2C. A third input signal, waveform 2D, not shown, is coupled in via a terminal 18 and will be described hereinbelow. Another internal signal, waveform 2E is shown in FIG. 2 as is waveform 2F which is the final output signal of the circuit of the present invention at an output terminal 20 which is coupled to the horizontal control circuits of the CRT.

The main components include a first flip-flop 26, a second flip-flop 28, a NAND gate 30, and a second NAND gate 32. The waveform 2A, the composite sync signal, is coupled from the terminal 10 to the CLK input of the flip-flop 28. The waveform 2B from the terminal 14 is coupled to both inputs of the NAND gate 32 which inverts the input signal to form the waveform 2C which, in turn, is coupled to the CLK input of the flip-flop 26. The D input of the flip-flop 26 is coupled to receive a +5 V input from a terminal 38.

The waveform 2D from the terminal 18 is coupled through a resistor 40 of a resistor-divider network 40, 42 to both inputs of the NAND gate 30. A capacitor 44 is also coupled from the NAND gate 30 inputs to ground. The NAND gate 30 output is coupled to provide the SET input of the flip-flop 26. The Q output of the flip-flop 26, which is waveform 2E, is coupled to the D input of the flip-flop 28. The /SET input of the flip-flop 28 is coupled to the +5 V terminal 38. The /Q output of the flip-flop 28 is coupled to the /CLR of the flip-flop 26 and, through a resistor 52, to the /CLR of the flip-flop 28 which is coupled through a capacitor 54 to ground.

It will be seen that the basic purpose of the invention is to transform the signal 2A to the signal 2F, (eliminating the unneeded pulses) while allowing the horizontal phase to be adjusted by the user. The frequencies used in this exemplary system are typically 77 Khz for the horizontal synchronization pulse rate, with 154 kHz the pulse rate during the vertical blanking period. These numbers will be used in the following description but in no sense should be construed as limiting the scope of the inventive circuit. Also used in the description is "1000" for the number of horizontal lines in one raster; i.e., after drawing 1000 horizontal lines on the raster, the electron beam will be blanked and will return to the top of the raster to produce another raster. The number 1000 is exemplary only and is also not to be construed as limiting the invention.

As is customary in monitor systems, a PLL (not shown) in the horizontal synchronization circuitry will search for the horizontal sync rate and will lock on that frequency. The signal 2D at the terminal 18, which is at 2.5 V or less when the PLL is locked, goes to +5 V when the PLL is not locked, causing the output of the NAND 30 and the SET input of the flip-flop 26 to go high. The Q1 output of the flip-flop 26 is then high, allowing all synchronization pulses to pass through unaffected until the system acquires lock.

The 2B signal, as noted above, is basically a pulse-width modulated signal at the 77 kHz rate with a duty cycle of at least 50%, typically 70% in the preferred embodiment. The 2B signal is coupled to both inputs of the NAND gate 32 where it is inverted to become signal 2C and coupled to the CLK input of the flip-flop 26. The 2B/2C signal then lets through all the 77 kHz pulses, but when the extra pulses of the 154 kHz signal try to go through, the gate is closed. By the time the subsequent pulse comes along, the gate has cleared and that pulse is passed through. This procedure is repeated to allow only the 77 kHz pulses through as shown in signal 2F.

The above procedure would be quite satisfactory if the horizontal synchronization signal phase (frequency) never changed, but since the user of the system has the choice of a range of 77 kHz to 57 kHz horizontal synchronization rates, the system must track the chosen rate. However, if the system is active during the change of horizontal rate, it will not be able to determine where the signal 2B/2C should be with respect to signal 2A, and the undesired pulses of signal 2A could be gated through, with the desired pulses possibly gated out.

Furthermore, there is a need to allow the phase relationship between the synchronization signal 2A and the pulse width modulated signal 2B/2C to vary over a limited range. This phase variation is a result of the system user adjusting the left-right position of the video or display within the raster. It is possible that the positive sync edge of signal 2B (and the negative sync edge of signal 2C) could be shifted in time before the occurrence of the positive sync edge 2A. This would result in erroneously gating out the desired horizontal synchronization pulse and disrupting the stability of the circuit. To prevent this error from happening, the inverted signal 2C is not used directly to clock the flip-flop 28 but, instead, first passes through the flip-flop 26 where the output is controlled as described hereinabove.

Thus, the function of the flip-flop 26 is needed for both of the reasons given above. When a user changes the operating mode; i.e., varies the horizontal rate from 77 kHz, the CRT system loses lock and the 2D signal at the input terminal 18 goes high, setting the signal 2E signal high at the Q1 output of the flip-flop 26 and the D input of flip-flop 28. All pulses of the 2A signal can now pass through during the period before the system acquires lock but cannot create the undesired "hooking" effect in the raster because the screen is blanked during lock acquisition. When the system is locked on the new horizontal synchronization frequency, the voltage at the terminal 18 is dropped to 2.5 V or less, making the SET terminal of the flip-flop 26 high, and the 2C signal on the CLK terminal will again be allowed to pass through to the D input of the flip-flop 28. Now, only the desired horizontal synchronization pulses of the newly chosen horizontal frequency will be allowed to pass through the Q2 output of the flip-flop 28 through the output terminal 20 to the horizontal control circuit of the CRT. The /CLR input of the flip-flop 26 is triggered by the /Q output from the flip-flop 28, preventing the negative portion of the signal 2C from occurring before the sync edge of the signal 2A. This allows the phase difference between the sync pulse of signal 2A and the signal 2B/2C to be varied without adversely affecting the output of the desired pulses of the horizontal synchronization pulses of the signal 2F to the horizontal synchronization circuitry.

There has been shown and described a simple and effective means of gating out the unwanted pulses from the horizontal synchronization signal of a monitor circuit and of preventing a change of horizontal synchronization frequency or phase from interfering with the gating process. It is intended to cover all such means as fall within the scope of the appended claims.

What is claimed is:

1. A circuit for use in a cathode ray tube device and comprising:

first input means for receiving a composite synchronization signal;

second input means for receiving a pulse-width modulated signal having a duty cycle greater than 50% and a pulse frequency equal to the normal horizontal line rate of said composite signal;

third input means for receiving a signal indicating when the CRT device has acquired lock on said normal horizontal synchronization rate;

a first flip-flop having D, SET, CLOCK and CLEAR inputs and Q and /Q outputs and coupled to be clocked by said composite synchronization signal and to provide an output signal Q including only pulses at said normal horizontal synchronization rate independently of the phase relationship between the composite sync signal and the pulse width modulated signal; and a second flip-flop having D, SET, CLOCK and CLEAR inputs and Q and /Q outputs and coupled to said second input means for being clocked by said pulse-width modulated signal, and coupled to said third input means for being set by said lock-indicating signal, and providing an output signal to the D input of said first flip-flop.

2. The circuit according to claim 1 wherein said composite synchronization signal contains video signals, vertical synchronization signals and horizontal synchronization signals.

3. The circuit according to claim 2 wherein said horizontal synchronization signals contains synchronization signals at a first frequency during certain portions of the signal and synchronization signals at double said first frequency during other portions of the signal.

4. The circuit according to claim 1 and wherein said pulse-width modulated signal has a duty cycle within the range of 45% to 75%.

5. The circuit according to claim 1 and wherein said pulse-width modulated signal has a duty cycle of approximately 70%.

6. The circuit according to claim 1 and wherein said pulse-width modulated signal varies in phase from said composite synchronization signal.

7. The circuit according to claim 6 and wherein said second flip-flop is coupled to prevent said phase variation from disrupting the output signal of said first flip-flop.

8. The circuit according to claim 7 and wherein the /CLR input of said second flip-flop is triggered by the square-wave pulse edges of said /Q output of said first flip-flop for preventing said output signal disruption.

9. The circuit according to claim 1 wherein said output signal of said first flip-flop is coupled to the raster control circuit of said cathode ray tube device.

10. A circuit for use in a cathode ray tube device having a raster control circuit and wherein an input synchronization signal includes both wanted and unwanted horizontal synchronization signals, the circuit comprising:

first input means for providing a signal having a duty cycle pulse greater than 50% at a frequency equal to the wanted synchronization signal;

second input means for providing a signal indicating whether the CRT device is locked on said wanted synchronization signal frequency; and logic means having a "Q" output and being coupled to said first and second input means for preventing said unwanted synchronization signals from appearing in the logic means output.

11. A circuit according to claim 10 wherein the logic means "Q" output is coupled to the raster control circuit of said cathode ray tube device.

12. A circuit according to claim 10 wherein said logic means includes a "D" type flip-flop means, said flip-flop means having a D input and a clock input.

13. A circuit according to claim 12 wherein a "D" type flip-flop has the D input coupled to said first input means.

14. A circuit according to claim 12 wherein said a "D" type flip-flop has the "clock" input coupled to receive said input synchronization signal.

15. A circuit according to claim 12 wherein said flip-flop means is a "D" type flip-flop having a D input and having the D input coupled to said second input means.

16. A circuit according to claim 10 and wherein said input synchronization signal includes a horizontal synchronizing signal and further includes second logic means having a "Q" output and being coupled to said first and second input means and said first logic means for allowing the phase of said input horizontal synchronization signal to vary without adversely affecting the Q output of said logic means output.

* * * * *